(12) United States Patent
Tabata et al.

(10) Patent No.: US 8,720,949 B2
(45) Date of Patent: May 13, 2014

(54) TONGUE AND SEAT BELT DEVICE USING THE SAME

(75) Inventors: Yuki Tabata, Tokyo (JP); Yoshihiko Kawai, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/819,167

(22) PCT Filed: Sep. 26, 2011

(86) PCT No.: PCT/IB2011/003005
§ 371 (c)(1),
(2), (4) Date: Feb. 26, 2013

(87) PCT Pub. No.: WO2012/042394
PCT Pub. Date: Apr. 5, 2012

(65) Prior Publication Data
US 2013/0154335 A1  Jun. 20, 2013

(30) Foreign Application Priority Data
Sep. 28, 2010 (JP) ................. 2010-216522

(51) Int. Cl.
*B60R 22/00* (2006.01)
(52) U.S. Cl.
USPC ..................... 280/801.1; 24/593.1
(58) Field of Classification Search
USPC ........... 280/801.1, 805; 24/265 BC, DIG. 51; 297/470
See application file for complete search history.

(56) References Cited

U.S. PATENT DOCUMENTS

| 7,996,964 | B2 * | 8/2011 | Wendt et al. ................. 24/593.1 |
| 8,230,558 | B2 * | 7/2012 | Wendt et al. ............. 24/265 BC |
| 2011/0258822 | A1 | 10/2011 | Wendt et al. |

FOREIGN PATENT DOCUMENTS

| DE | 10210781 A1 | 10/2003 |
| JP | 2002-337658 | 11/2002 |
| JP | 2003-089345 | 3/2003 |
| JP | 2007-099240 | 4/2007 |
| JP | 2009-166586 | 7/2009 |
| WO | WO 2008/098941 A1 | 8/2008 |
| WO | WO 2009/043837 A1 | 4/2009 |

OTHER PUBLICATIONS

International Search Report PCT/IB2011/003005 dated Mar. 29, 2012.

* cited by examiner

*Primary Examiner* — Faye M. Fleming
(74) *Attorney, Agent, or Firm* — Foley & Lardner LLP

(57) ABSTRACT

Recess portions (15) and (16) are disposed in a seat-belt sliding face (14) of a seat-belt sliding member (13), and a predetermined number of projections (17) are provided independently of each other in a dotted state in the recess portions (15) and (16). In each of the projections (17), sliding resistance between a seat belt (4) and the seat-belt sliding member (13) in a normal time is small, and the sliding resistance between the seat belt (4) and the seat-belt sliding member (13) when the seat belt (4) slides to the lap belt (4*c*) side is larger than the sliding resistance between the seat belt (4) and the seat-belt sliding member (13) when the seat belt (4) slides to the shoulder belt (4*b*) side. By means of the dotted-state projections (17), extension of the lap belt (4*c*) in an emergency is suppressed.

9 Claims, 6 Drawing Sheets

FIG. 4
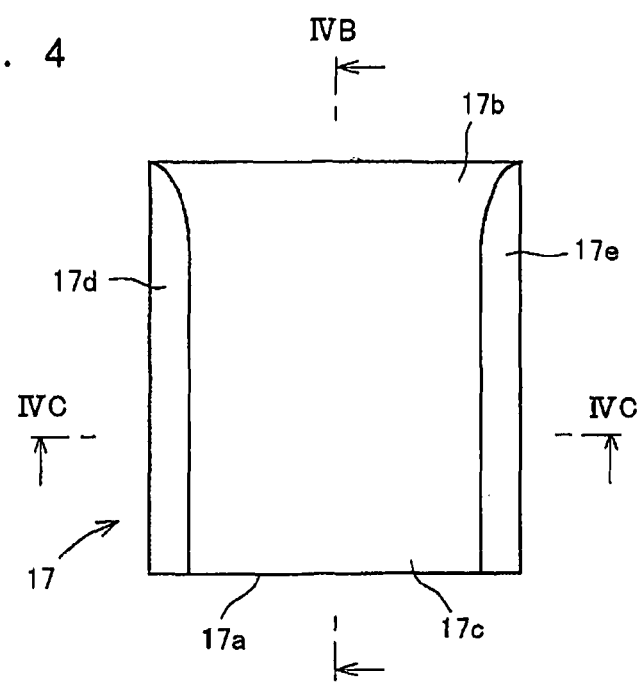
(A)
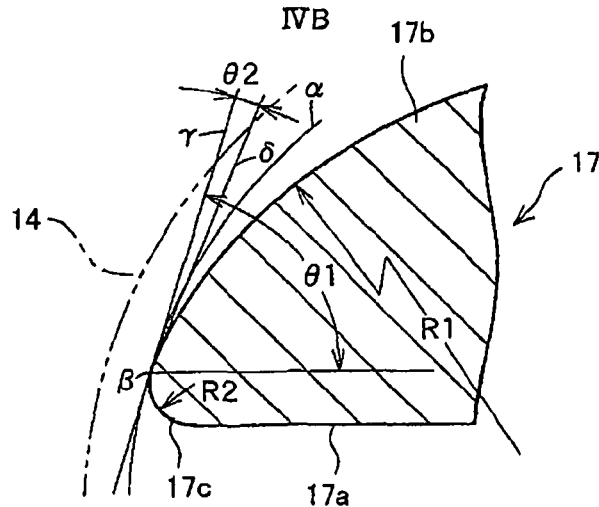
(B)
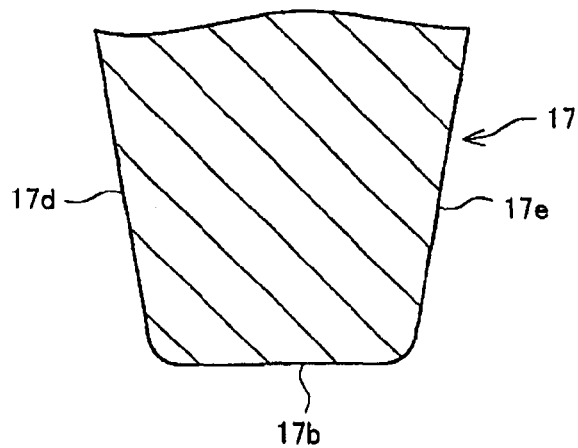
(C)

TONGUE AND SEAT BELT DEVICE USING THE SAME

TECHNICAL FIELD

The present invention relates to a tongue used in a seat belt device and slidably supported by a seat belt and engaged with a buckle fixed to a car body or the like and to a seat belt device using the same.

BACKGROUND ART

Hitherto, in the seat belt device attached to a seat of a vehicle such as an automobile, an occupant is constrained by a seat belt in an emergency such as a case in which a large deceleration acts on the vehicle at a collision or the like.

As this type of seat belt devices, a three-point seat belt device is widely known in general and often used. In the known general three-point seat belt device, a seat belt withdrawn from a seat-belt retractor and whose distal end is fixed to the car body is guided by a belt guide toward an occupant. A tongue is slidably supported by the guided seat belt. In that case, the seat belt is inserted through an elongated belt insertion hole of the tongue. And when the tongue is engaged with a buckle fixed to the car body, the seat belt is worn by the occupant. In a state in which the seat belt is worn by the occupant, the seat belt between the belt guide and the tongue functions as a shoulder belt worn by the shoulder and the chest of the occupant, and the seat belt between one end fixed to the car body and the tongue also functions as a lap belt worn by the lap of the occupant. In the above-described emergency, an emergency lock mechanism of the seat-belt retractor operates and prevents withdrawal of the seat belt, whereby forward movement of the occupant by inertia is prevented and the occupant is constrained by the seat belt.

Particularly, in recent years, the seat-belt retractor is provided with a pre-tensioner, and in an emergency, this pre-tensioner is operated in the beginning of the emergency, and the seat-belt retractor retracts the seat belt, whereby looseness of the seat belt is rapidly reduced. As a result, forward movement of the occupant is suppressed, and constraint effect for the occupant is improved. Moreover, the seat-belt retractor is provided with an energy absorption (EA) mechanism, and the seat belt is somewhat withdrawn by this energy absorption mechanism when the emergency lock mechanism operates so that impact energy to the seat belt of the occupant is absorbed and relaxed.

In this type of seat belt devices, in general, even if the emergency lock mechanism of the seat-belt retractor is operated in an emergency, the lap belt is somewhat extended by an inertial force of the occupant, and the occupant somewhat moves forward. Thus, it becomes difficult to effectively constrain the occupant by the lap belt. In that case, even if looseness of the belt is eliminated by the pre-tensioner as described above at occurrence of an emergency, after the operation of the pre-tensioner is finished, that is, after the retraction of the seat belt in the beginning of the emergency, the lap belt can similarly extend by the inertial force of the occupant.

Thus, a tongue is proposed which is configured such that friction between the seat belt and a seat-belt sliding face is reduced in a normal operation of the seat belt and the seat belt slides smoothly with respect to the tongue, but in an emergency, the friction between the seat belt and the seat-belt sliding face increases and the seat belt does not extend to the lap belt side (See PTL 1, for example).

With the tongue described in PTL 1, a large number of axial grooves consecutively extending linearly substantially in the longitudinal direction of a belt insertion hole and a large number of circumferential grooves consecutively extending in a direction substantially orthogonal to the longitudinal direction of the belt insertion hole are provided on the seat-belt sliding face of the belt insertion hole of the tongue. In that case, each axial groove and each circumferential groove are provided on the whole region in the longitudinal direction of the seat-belt sliding face of the elongated belt insertion hole. In the normal operation of the seat belt, the seat belt slides substantially only on the seat-belt sliding face so that friction between the seat belt and the seat-belt sliding face is reduced. As a result, in the normal operation of the seat belt, the seat belt slides smoothly with respect to the tongue. In an emergency, since the seat belt is pulled on the both sides of the tongue by the inertial force of the occupant, the tension of the seat belt increases. By means of the increased tension, the seat belt sinks in the axial grooves and the circumferential grooves, and the friction between the seat belt and the seat-belt sliding face increases. As a result, extension of the seat belt to the lap belt side in an emergency is suppressed. As described above, since extension of the seat belt to the lap belt side is suppressed in the emergency, constraint by the lap belt on the occupant is improved.

Also, in PTL 1, a plurality of projected rims consecutively extending substantially linearly in the longitudinal direction of the belt insertion hole are disposed on the belt sliding face projecting from this belt sliding face and at predetermined intervals in the circumferential direction. It is disclosed that friction between the seat belt and the seat-belt sliding face is changed by these projected rims between the normal operation of the seat belt and the emergency. In that case, in the normal operation of the seat belt, since the seat belt slides only on the surface of each projected rim, the friction between the seat belt and the seat-belt sliding face is reduced. Also, in an emergency, each projected rim falls down to the lap belt side due to the increasing tension of the seat belt, and since the seat belt slides also on the surface of the other portions on the belt-sliding face, the friction between the seat belt and the seat-belt sliding face increases.

Moreover, in PTL 1, it is disclosed that a plurality of resin members projecting from the belt sliding face are provided so that the friction between the seat beat and the seat-belt sliding face is changed by these resin members between the normal operation of the seat belt and the emergency. In that case, in the normal operation of the seat belt, the seat belt is set to slide only on the surface of each resin member. As a result, the friction between the seat belt and the seat-belt sliding face is reduced. Also, in an emergency, it is so configured that each resin member is crushed or cut off by the increasing tension of the seat belt, and the seat belt slides also on the surface of the other portions on the belt sliding face. As a result, the friction between the seat belt and the seat-belt sliding face increases.

CITATION LIST

Patent Literature

PTL 1: Japanese Unexamined Patent Application Publication No. 2009-166586

SUMMARY OF INVENTION

Technical Problem

With the tongue described in PTL 1, the axial grooves seriously involved with the friction between the seat belt and the seat-belt sliding face are formed consecutively on the whole surface substantially linearly in the longitudinal direction of the belt insertion hole of the seat-belt sliding face. Thus, if the tension of the seat belt increases in an emergency, the seat belt cannot effectively sink into the substantially linear axial grooves. Therefore, it is difficult to obtain large friction between the seat belt and the seat-belt sliding face in an emergency with these axial grooves.

The projected rims are also formed consecutively on the whole surface in the longitudinal direction of the belt insertion hole on the seat-belt sliding face substantially linearly similarly to the above-described axial grooves. Thus, by means of these projected rims, it is also difficult to obtain large friction between the seat belt and the seat-belt sliding face in an emergency. Moreover, the projected rims are only configured to fall down in an emergency, and the seat belt is brought into contact with the normal seat-belt sliding face, and thus, it is difficult to obtain large friction between the seat belt and the seat-belt sliding face more effectively. Moreover, the resin member disposed projecting on the seat-belt sliding face is formed so as to be simply crushed or cut off in an emergency. Thus, since the resin member is only configured to be crushed or cut off so that the seat belt is brought into contact with the normal seat-belt sliding face, it is difficult to obtain large friction between the seat belt and the seat-belt sliding face more effectively.

Therefore, with the tongue described in PTL 1, though a certain advantage that extension of the lap belt is suppressed in an emergency can be obtained, there is a room for improvement in effective suppression of extension of the lap belt in an emergency.

Moreover, all the sectional shapes of the axial grooves, circumferential grooves, projected rims and resin members along the sliding direction of the seat belt are substantially the same in either on the shoulder belt side and the lap belt side of them. That is, the sectional shapes of the axial grooves, circumferential grooves, projected rims and resin member along the sliding direction of the seat belt are shapes not having directivity with respect to the sliding direction of the seat belt. Thus, with the tongue described in PTL 1, with any of the axial grooves, circumferential grooves, projected rims and resin members, the friction between the seat belt and the seat-belt sliding face cannot be effectively changed between the normal operation of the seat belt and the emergency.

The present invention was made in view of the above circumstances and an object thereof is to provide a tongue that can effectively suppress extension of the lap belt in an emergency and further improve constraining performances on the occupant by the seat belt and a seat belt device using the same.

Solution to Problem

In order to solve the above problems, a tongue according to the present invention has, in a tongue which is slidably supported by a seat belt and divides the seat belt into a shoulder belt and a lap belt and is provided capable of being engaged with a buckle, an elongated belt insertion hole through which the seat belt is inserted and a seat-belt sliding portion having a seat-belt sliding face which forms a part of the belt insertion hole and on which the seat belt slides, in which the seat-belt sliding portion has a predetermined number of recess portions disposed in the seat-belt sliding face and a predetermined number of projections disposed independently of each other in a dotted state in the recess portions, each of the projections is provided such that sliding resistance between the seat belt and the seat-belt sliding portion is small in a normal time and the sliding resistance between the seat belt and the seat-belt sliding portion when the seat belt slides to the lap belt side in an emergency is larger than the sliding resistance between the seat belt and the seat-belt sliding portion when the seat belt slides to the shoulder belt side.

Also, the tongue according to the present invention is characterized in that the end face of the projection on the shoulder belt side is a flat or substantially flat face, and the end face of the projection on the lap belt side is an arc or substantially arc curved face.

Moreover, the tongue according to the present invention is characterized in that the end face on the shoulder belt side of at least a part of the projections is provided so as to be orthogonal or substantially orthogonal to the seat belt, and the end face on the lap belt side of at least a part of the projections is provided so as to be oblique to the seat belt.

Moreover, the tongue according to the present invention is characterized in that the seat-belt sliding face is provided at least on both end portions in the longitudinal direction of the belt insertion hole.

Moreover, the tongue according to the present invention is characterized in that all the projections are provided so as not to project from the recess portions beyond the seat belt sliding face.

Moreover, the tongue according to the present invention is characterized in that all the recess portions are extended in the same direction as the insertion direction of the belt insertion hole of the seat belt or extended substantially in the same direction as the insertion direction when the seat belt is worn.

Moreover, the tongue according to the present invention, the projections are provided in alignment in the same direction as the extended direction of the recess portions or provided in alignment substantially in the same direction as the extended direction of the recess portions when the seat belt is worn.

On the other hand, the seat belt device according to the present invention is provided at least with a seat belt, a seat-belt retractor which retracts this seat belt, the tongue slidably supported by the seat belt, and a buckle in which the tongue is inserted and engaged, and in the seat belt device in which the seat belt is worn by an occupant by inserting and engaging the tongue in the buckle, the tongue is made of the tongue described in any one of the above-described tongues of the present invention.

Advantageous Effects of Invention

According to the tongue according to the present invention configured as above, the seat-belt sliding portion has the predetermined number of recess portions disposed in the seat-belt sliding face and the predetermined number of projections provided independently of each other in a dotted state in the recess portion. Therefore, in a normal time, when the seat belt slides on the seat-belt sliding face, the sliding resistance between the tongue and the seat belt can be reduced. As a result, even if the predetermined number of projections are provided, the tongue can be made to slide with respect to the seat belt easily and smoothly in the normal time. As a result, handling of the tongue in the normal time can be facilitated.

Also, by providing the predetermined number of projections independently of each other in a dotted state in the recess portions, the peripheries of the projections can be largely dented. If the tension of the seat belt is increased by inertial movement of the occupant in an emergency, the seat belt is easily deflected by the projections and effectively bites into the whole periphery of the projections. As a result, the sliding resistance of the seat belt with respect to the seat-belt sliding portion of the tongue can be increased effectively. Therefore, when the tension of the seat belt has been increased by the inertia of the occupant after the seat belt has been retracted, extension of the lap belt can be effectively suppressed. As a result, the lap of the occupant is firmly constrained in the emergency, and as compared with the above-described tongue described in PTL 1, occupant constraint by the lap belt of the seat belt can be improved further greatly.

Moreover, all the projections are configured such that the sliding resistance between the seat belt and the seat-belt sliding portion in a normal time is small and the sliding resistance between the seat belt and the seat-belt sliding portion when the seat belt slides toward the lap belt side in an emergency is set so as to become larger than the sliding resistance between the seat belt and the seat-belt sliding portion when the seat belt slides toward the shoulder belt side. That is, the sectional shape of each of the projection in the sliding direction of the seat belt has directivity to the sliding direction of the seat belt. As a result, when the seat-belt retractor retracts the seat belt by the operation of the pre-tensioner or the like in the beginning of an emergency, even if the seat belt is brought into contact with the projections relatively strongly, the seat belt can slide from the lap belt side toward the shoulder belt side easily and smoothly. Therefore, initial occupant constraint by the seat belt can be improved. Also, when the tension of the seat belt has been increased by the inertia of the occupant after the seat belt has been retracted in the beginning of an emergency, the extension of the lap belt can be suppressed further effectively by means of the large sliding resistance between the seat belt and the seat-belt sliding portion. As a result, the occupant constraint by the seat belt on inertial movement of the occupant can be improved furthermore.

Particularly, since the end face of the projection on the shoulder belt side is a flat or substantially flat face, and since the end face on the lap belt side is an arc or substantially arc curved face, slidability of the seat belt in retraction of the seat belt in the beginning of an emergency is made favorable with a simple structure, and extension of the lap belt when the tension of the seat belt has been increased by the inertia of the occupant after the seat belt has been retracted in the beginning of an emergency can be effectively suppressed. Therefore, the lap of the occupant is firmly constrained by the lap belt, and occupant constraint by the seat belt can be improved. Moreover, since the end faces on the shoulder belt side of at least a part of the projections are provided so as to be orthogonal or substantially orthogonal to the seat belt and since the end faces on the lap belt side of at least a part of the projections are provided so as to be oblique to the seat belt, the above-described extension of the lap belt can be suppressed further effectively.

Also, the seat-belt sliding face is provided on both end portions at least in the longitudinal direction of the belt insertion hole. As a result, even if the predetermined number of recess portions are provided on the seat-belt sliding face, the both side ends in the longitudinal direction of the seat belt are located on the seat-belt sliding face on the both end portions in the longitudinal direction of the belt insertion hole, and thus, it is less likely that the both side ends of the seat belt are located in the recess portions. Therefore, even if the predetermined number of recess portions are provided on the seat-belt sliding face, reversion of the seat belt in the belt insertion hole of the tongue is suppressed, and slidability between the tongue and the seat belt can be improved. As a result, handling performances of the tongue and the seat belt are improved.

Moreover, since all the projections are provided so as not to project outward from the recess portions beyond the seat-belt sliding face, the seat belt rarely slides to be brought into contact with the seat-belt sliding face and even if it is brought into contact with the projections, its contact force is extremely small. Therefore, even if the predetermined number of projections are provided, the sliding resistance between the tongue and the seat belt can be reduced. As a result, even if the predetermined number of projections are provided in the normal time, the tongue can be made to slide with respect to the seat belt easily and smoothly, and handling of the tongue in the normal time can be facilitated furthermore.

Moreover, since the recess portions are disposed in the same direction or substantially in the same direction as the seat-belt insertion direction, and since the projections are provided in alignment in the same direction or substantially in the same direction as the extended direction of the recess portions, the slidability between the tongue and the seat belt in the normal time is made favorable, and extension of the lap belt in an emergency can be suppressed further effectively.

On the other hand, according to the seat belt device according to the present invention using the tongue of the present invention, sliding of the tongue with respect to the seat belt in the normal time can be made easy and smooth, and in extension of the seat belt caused by the inertial movement of the occupant in an emergency, the sliding of the seat belt with respect to the tongue is suppressed, and extension of the lap belt can be suppressed more effectively. As a result, the occupant can wear the seat belt more easily in the normal time, and constraint on the occupant in an emergency can be further improved.

BRIEF DESCRIPTION OF DRAWINGS

FIG. 4(A) is a lower face view of a projection of this example, FIG. 4(B) is a sectional view along IVB-IVB line in FIG. 4(A), and FIG. 4(C) is a sectional view along IVC-IVC line in FIG. 4(A).

DESCRIPTION OF EMBODIMENTS

An embodiment of the present invention will be described below using the drawings.

Figure 1:
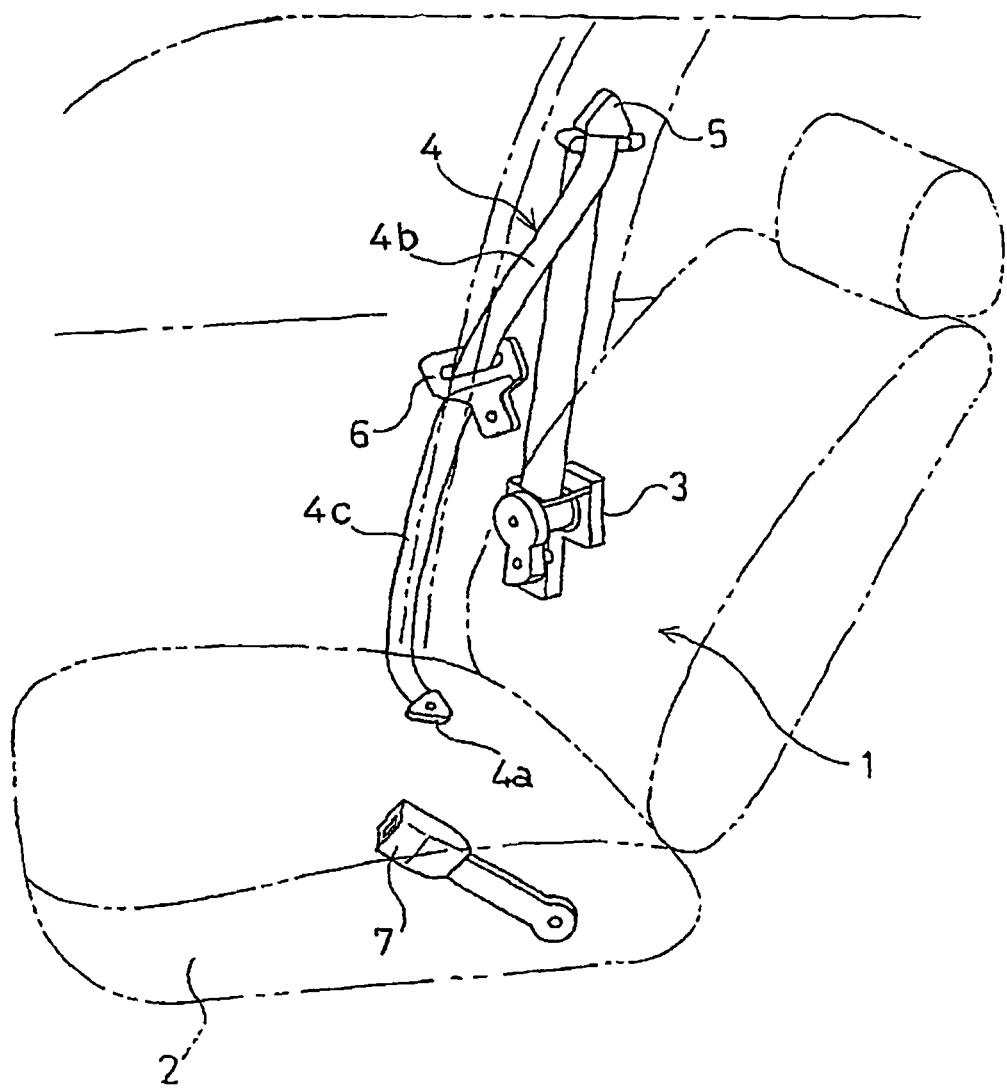
FIG. 1 is a schematic diagram illustrating an example of an embodiment of a seat belt device provided with a tongue according to the present invention.

FIG. 1 is a view schematically illustrating an example of the embodiment of a seat belt device provided with a tongue according to the present invention.

As illustrated in FIG. 1, a seat belt device 1 of this example is basically the same as known three-point seat belt devices. In the figure, reference numeral 1 denotes a seat belt device, reference numeral 2 denotes a vehicle seat, reference numeral 3 denotes a seat-belt retractor disposed in the vicinity of the vehicle seat 2, reference numeral 4 denotes a seat belt retracted by the seat-belt retractor 3 capable of being pulled out and having a belt anchor 4a at the distal end fixed to the floor of the car body or the vehicle seat 2, reference numeral 5 denotes a guide anchor which guides the seat belt 4 pulled out from the seat-belt retractor 3 toward the shoulder of an occupant, reference numeral 6 denotes a tongue slidably supported by the seat belt 4 guided by this guide anchor 5, and reference numeral 7 denotes a buckle fixed to the floor of the car body or the vehicle seat and in which the tongue 6 is detachably inserted and engaged.

A wearing operation and a wearing-releasing operation of the seat belt 4 in this seat-belt device 1 are both the same as those of the known seat-belt devices.

When the seat belt 4 is not worn, the tongue 6 is not engaged with the buckle 7, and the seat belt 4 is retracted by the seat-belt retractor 3 in the full amount (amount that can be retracted). Also, when the seat belt 4 is worn by the occupant, the seat belt 4 is pulled out of the seat-belt retractor 3 by a predetermined amount, and the tongue 6 is engaged with the buckle 7. After that, when the hand is released from the tongue 6, an extra portion of the pulled out seat belt 4 is retracted by the seat-belt retractor 3. In this way, the seat belt 4 is worn by the occupant.

In a state in which the seat belt 4 is worn by the occupant, the tongue 6 divides the seat belt 4 to a shoulder belt 4b and a lap belt 4c. In that case, the portion of the seat belt 4 between the guide anchor 5 and the tongue 6 is a shoulder belt 4b which constrains the shoulder and the chest of the occupant, and the portion of the seat belt 4 between the belt anchor 4a and the tongue 6 is a lap belt 4c which constrains the lap of the occupant (In FIG. 1, reference numerals 4b and 4c are shown at corresponding spots for convenience of the explanation though the seat belt is not worn).

For the seat-belt retractor 3 used in the seat belt device 1 in this example, a prior-art general emergency-lock type seat-belt retractor (ELR) or an automatic lock-type seat-belt retractor (ALR) may be used.

Therefore, while the seat belt 4 is worn, the seat belt 4 can be freely pulled out at a normal belt pulling-out speed in the normal time other than the above-described emergency. Also, in the above-described emergency, the seat-belt retractor 3 locks pulling-out of the seat belt 4, and the seat belt 4 prevents inertial movement of the occupant by constraining the occupant. The seat-belt retractor 3 in this example is provided with the above-described pre-tensioner and an EA mechanism, not shown. In the present invention, the pre-tensioner and the EA mechanism may be omitted.

Figure 2:
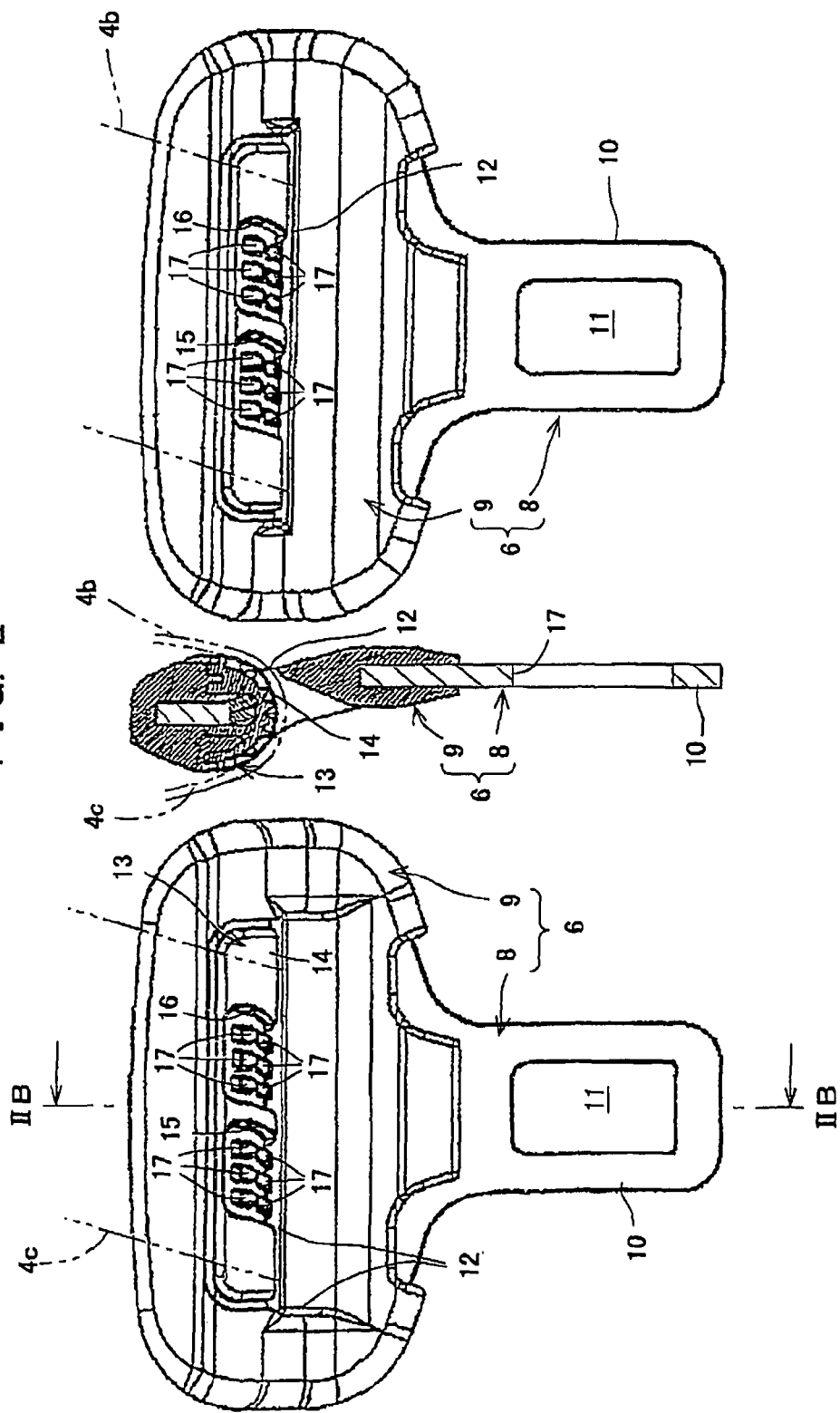
FIG. 2(A) is a front view schematically illustrating an example of the embodiment of the tongue of the present invention used in the seat belt device in this example (view illustrating a lap belt side)
FIG. 2(B) is a sectional view along IIB-IIB line in FIG. 2(A)
FIG. 2(C) is a back face view (view illustrating a shoulder belt side).

FIG. 2(A) is a front view schematically illustrating an example of the embodiment of the tongue of the present invention used in the seat belt device in this example (view illustrating a lap belt side), FIG. 2(B) is a sectional view along IIB-IIB line in FIG. 2(A), and FIG. 2(C) is a back face view (view illustrating a shoulder belt side).

As illustrated in FIGS. 2(A) to 2(C), the tongue 6 in this example has a tongue plate 8 having a substantially T-shape made of metal and a resin mold portion 9 in which a portion corresponding to a grasping portion of this tongue plate 8 is coated with a resin. A portion orthogonal to the resin mold portion 9 of the tongue plate 8 is a buckle insertion portion 10 that can be inserted into the buckle 7, and an engagement hole 11 having a rectangular shape which enables engagement of the tongue 6 with a latch (not shown) of the buckle 7 is provided in this buckle insertion portion 10.

Also, in the resin mold portion 9 of the tongue 6, an elongated belt insertion hole 12 through which the seat belt 4 is inserted is provided. On a side edge portion on the side opposite to the buckle insertion portion 10 of the tongue plate 8 in the both side edge portions in the longitudinal direction of this belt insertion hole 12, an elongated seat-belt sliding member 13 (corresponding to the seat-belt sliding portion of the present invention) on which the seat belt 4 inserted through the belt insertion hole 12 slides is provided. This seat-belt sliding member 13 is integrally molded with the resin of the resin mold portion 9 and also forms a part of the belt insertion hole 12.

Figure 3:
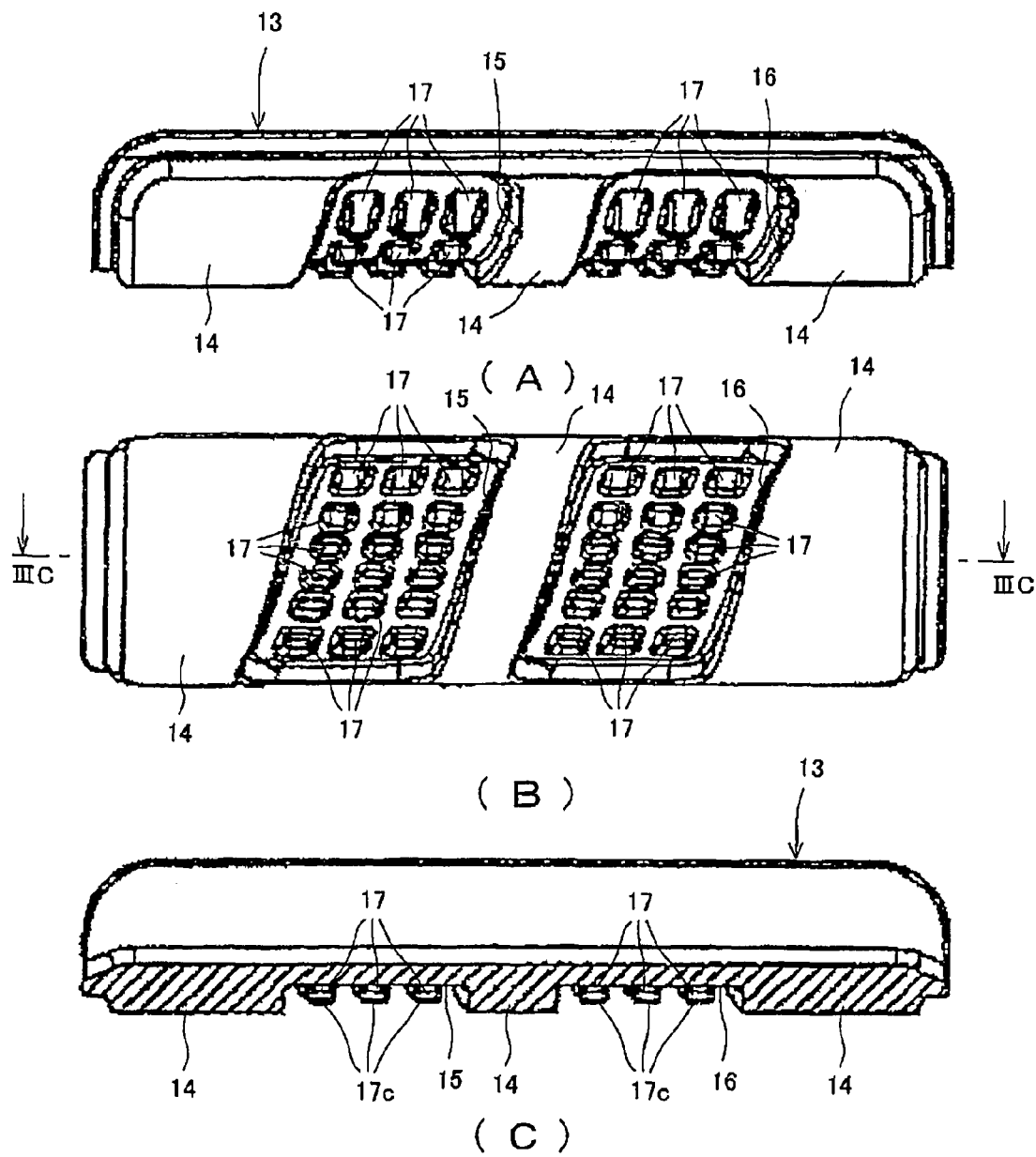
FIG. 3(A) is a front view of a seat-belt sliding member in this example (view illustrating the lap belt side)
FIG. 3(B) is a lower face view.
FIG. 3(C) is a sectional view along IIIC-IIIC line in FIG. 3(B).

As illustrated in FIG. 2(B), a transverse section orthogonal to the longitudinal direction in a seat-belt sliding face 14 of the seat-belt sliding member 13 is formed in an arc shape. Also, as illustrated in FIGS. 3(A) to 3(C), recess portions 15 and 16 extending with inclination in the same direction as the insertion direction of the seat belt 4 or substantially in the same direction as insertion direction when the seat belt 4 is worn are provided on the seat-belt sliding face 14 of the seat-belt sliding member 13. A predetermined number (in the illustrated example, 3 pieces in the longitudinal direction and 6 pieces in the seat-belt insertion direction, which makes the total of 18 pieces) of projections 17 are provided independently of each other in a dotted state on these recess portions 15 and 16, respectively. In that case, the projections 17 are provided in alignment in the longitudinal direction of the seat-belt sliding member 13 and also in alignment in the same direction or substantially in the same direction as the extended direction of the recess portions 15 and 16 when the seat belt 4 is worn. These projections 17 are formed so as to have substantially the same shape.

As illustrated in FIG. 4(A), the projection 17 is formed having a substantially rectangular shape slightly longer in the seat-belt insertion direction on lower-face view. Also, as illustrated in FIG. 4(B), in the seat-belt insertion direction (vertical direction in FIG. 4(A); the upward direction is the lap belt 4c side) an end face 17a on the shoulder belt 4b side is formed flat or substantially flat and an end face 17b on the lap belt 4c side in the seat-belt insertion direction, the transverse section is formed as a curved face of an arc shape of a circle having a large radius R1. A distal end 17c of the projection 17 where the both end faces 17a and 17b cross each other is formed as an arc-shaped portion (R portion) of a circle having a radius R2 considerably smaller than the radius R1 of the end face 17b. The shapes of the end face 17a on the shoulder belt 4b side and the end face 17b on the lap belt 4c side are not limited to those described above. Also, the distal end 17c may be formed as an angled edge portion instead of the R portion. Moreover, as illustrated in FIGS. 4(A) and 4(C), the both side end faces 17d and 17e extending in the seat-belt insertion direction are formed as inclined faces, each having a transverse section of a substantially trapezoidal shape inclined so as to approach each other toward the end face 17b. In that case, the inclination angles of the both side end faces 17d and 17e are made equal to each other in absolute values but not limited by that.

Figure 5:
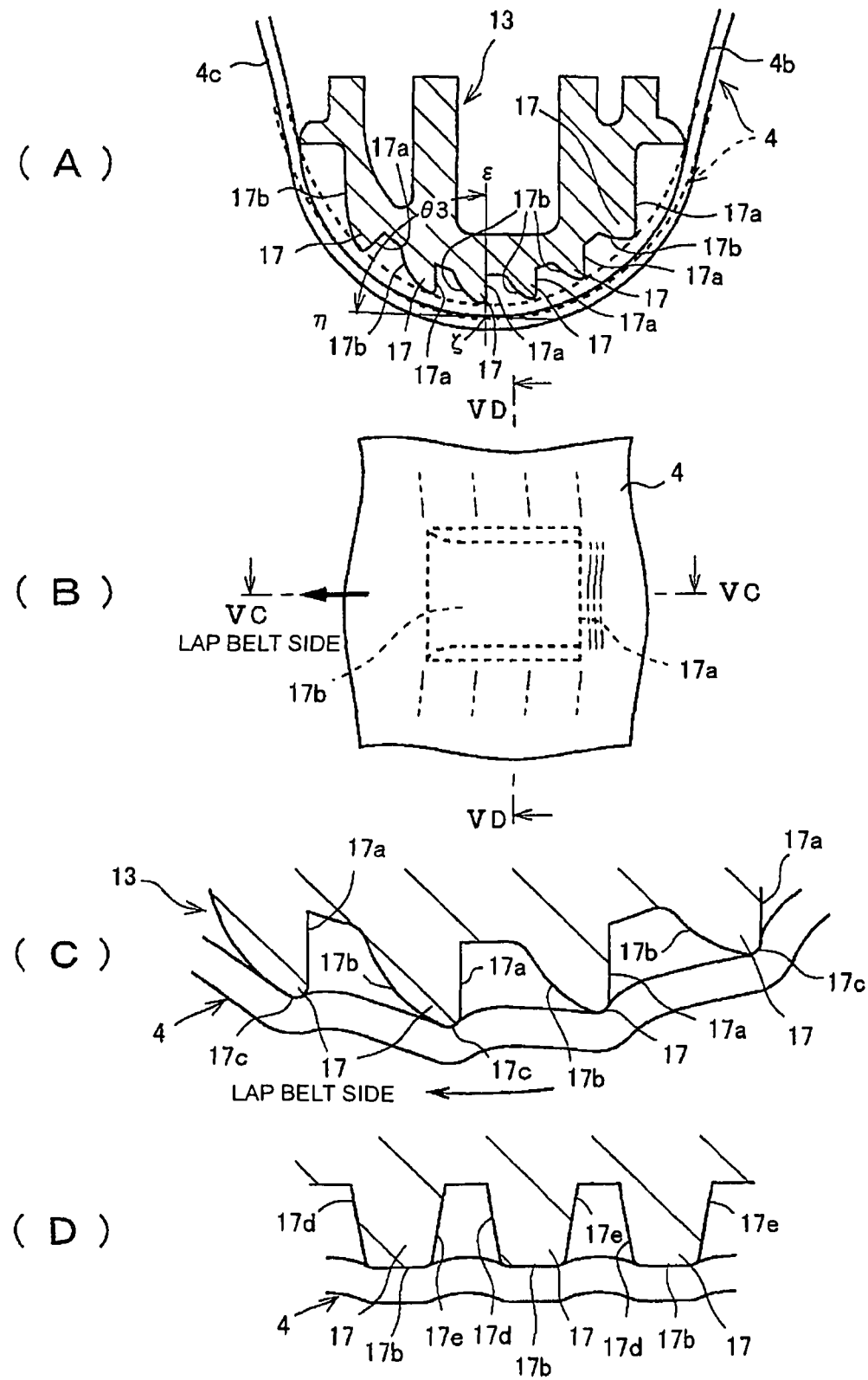
FIG. 5(A) is a sectional view for explaining behavior of the seat belt by the projection in this example.
FIG. 5(B) is a lower face view for explaining behavior of the seat belt by the projection in an emergency.
FIG. 5(C) is a sectional view along VC-VC line in FIG. 5(B)
FIG. 5(D) is a sectional view along VD-VD line in FIG. 5(B).

As illustrated in FIGS. 2(B) and 5(A), at least a part of the projections 17 are provided so that the end faces 17a on the shoulder belt 4b side are oriented substantially in the same direction as the projecting direction of the buckle insertion portion 10. As a result, the end faces 17a on the shoulder belt 4b side are oriented in the direction orthogonal or substantially orthogonal to the seat belt 4 sliding on the seat-belt sliding member 13, and the end faces 17b on the lap belt 4c side are oriented oblique to the seat belt 4 sliding on the seat-belt sliding member 13 with gentle inclination. That is, as illustrated in FIG. 4(B), an angle θ1 formed by a tangent γ of a concentric circle α at a contact β where the concentric circle α of the arc of the seat-belt sliding face 14 is tangent to the projection 17 and the plane of the end face 17a on the shoulder belt 4b side at the contact β is set larger than an angle θ2 formed by the tangent γ of the concentric circle α and a tangent δ of an arc-shaped curved face of the end face 17b on the lap belt 4c side at the contact β. Therefore, as illustrated in FIG. 5(A), with regard to the end face 17a on the shoulder belt 4b side, an angle θ3 formed by a virtual extension ε (actually an extended face) of this end face and a tangent η passing through a point ξ crossing the inner circumferential side of the arc-shaped seat belt 4 sliding on the belt sliding face 14 is substantially a right angle (that is, the end face 17a is substantially orthogonal to the seat belt). That is, the sectional shape of each of the projections 17 along the sliding direction of the seat belt 4 has directivity with respect to the sliding direction of the seat belt 4.

Moreover, as illustrated in FIG. 3(C), the distal end 17c of the projection 17 is located within the recess portions 15 and 16 below the seat-belt sliding face 14 (the height of the distal end 17c is lower than the height of the seat-belt sliding face 14) or on the plane flush with the seat-belt sliding face 14 (the height of the distal end 17c is the same as the height of the seat-belt sliding face 14). That is, the distal end 17c of the projection 17 does not protrude beyond the seat-belt sliding face 14 from the recess portions 15 and 16 (the height of the distal end 17c is not higher than the height of the seat-belt sliding face 14).

In the tongue 6 of this example configured as above, if the seat belt 4 slides with respect to the tongue 6 (through an engagement operation of the tongue 6 with the buckle 7, intentional movement by the occupant in the seat-belt worn state and the like) in the normal time (other than an emergency), as indicated by a solid line is FIG. 5(A), the seat belt 4 slides with respect to the seat-belt sliding face 14 of the seat-belt sliding member 13. At this time, since the distal end 17c of the projection 17 does not protrude from the seat-belt sliding face 14, the seat belt 4 is not brought into contact with the distal end 17c of the projection 17 or is brought into contact with the distal end 17c with little contact force. Therefore, in the normal time, the seat belt 4 slides with respect to the tongue 6 in either direction of the shoulder belt 4b side and the lap belt 4c side easily and smoothly.

Also, in the above-described emergency, after the seat-belt retractor 3 retracts the seat belt 4 by a predetermined amount by means of an operation of the pre-tensioner, not shown, so as to constrain the occupant relatively strongly, withdrawal of the seat belt 4 is locked. By means of the retraction of the seat belt 4 by the operation of the pre-tensioner, a tension is generated in the seat belt 4. Thus, as indicated by a dotted line in FIG. 5(A), the seat belt 4 is brought into contact with each of the projections 17 with a contact force relatively larger than that in the normal time. However, as described above, since the end face 17b on the lap belt 4c side is formed as an inclined face having a relatively large diameter and inclined gently in the sliding direction of the seat belt 4, even if the seat belt 4 is brought into contact with each of the projections 17 with a contact force relatively larger than that in the normal time, the seat belt 4 slides easily and smoothly. As a result, the seat belt 4 is stably retracted by the seat-belt retractor 3.

Subsequently, by means of inertial movement of the occupant, the seat belt 4 is pulled both in the directions of the shoulder belt 4b and the lap belt 4c. At this time, if the force pulled to the lap belt 4c side is larger than the force pulled to the shoulder belt 4b side, the seat belt 4 is pulled to the lap belt 4c side. Also, at this time, a considerably large tension is generated in the seat belt 4. Thus, as illustrated in FIGS. 5(B) to 5(D), the seat belt 4 is bitten into relatively largely by the projections 17 in contact, and the sliding resistance of the seat belt 4 against the seat-belt sliding member 13 increases. Particularly, since each of the projections 17 is provided independently of each other in a dotted state and the periphery of each projection 17 is dented, the seat belt 4 is easily deflected by the projections 17 and effectively bitten into over the whole circumference of the projection 17. Therefore, the sliding resistance of the seat belt 4 is further increased. Moreover, since the end face 17a on the shoulder belt 4b side is in the direction substantially orthogonal to the sliding direction of the seat belt 4, as illustrated in FIG. 5(C), the seat belt 4 is largely bitten into by the projections 17 on the end face 17a side, and the sliding resistance of the seat belt 4 is further increased. Therefore, the seat belt 4 is not extended to the lap belt 4c side easily but extension of the lap belt 4c is effectively suppressed. As a result, the lap of the occupant is firmly constrained by the lap belt 4c.

As described above, each of the predetermined number of projections 17 has small sliding resistance between the seat belt 4 and the seat-belt sliding member 13 in the normal time and provided so that the sliding resistance between the seat belt 4 and the seat-belt sliding member 13 when the seat belt 4 slides to the lap belt 4c side in an emergency is larger than the sliding resistance between the seat belt 4 and the seat-belt sliding member 13 when the seat belt 4 slides to the shoulder belt 4b side. That is, each of the projections 17 has directivity to the sliding direction of the seat belt 4.

According to the tongue 6 of this example, the seat-belt sliding member 13 has the predetermined number of recess portions 15 and 16 provided in the seat-belt sliding face 14 and has the predetermined number of projections 17 provided in the dotted state and independently of each other in these recess portions 15 and 16. Therefore, in the normal time, since the seat belt 4 slides with respect to the seat-belt sliding face 14, the sliding resistance between the tongue 6 and the seat belt 4 can be reduced. As a result, even if the predetermined number of projections 17 are provided, the tongue 6 can slide with respect to the seat belt 4 easily and smoothly in the normal time. As a result, handling of the tongue 6 in the normal time can be facilitated.

Also, since the predetermined number of projections 17 are provided in the recess portions 15 and 16 independently of each other in the dotted state, the peripheries of the projections can be largely dented. If the tension of the seat belt 4 is increased by the inertial movement of the occupant in an emergency, the seat belt 4 is easily deflected by the projections and can be effectively bitten into over the whole circumference of the projections. As a result, the sliding resistance of the seat belt against the seat-belt sliding member 13 of the tongue 6 can be effectively increased. Therefore, when the tension of the seat belt 4 is increased by the inertia of the occupant after the seat belt has been retracted, extension of the lap belt 4c can be effectively suppressed. As a result, the lap of the occupant is firmly constrained by the lap belt 4c in an emergency, and as compared with the case of the tongue described in the above-described PTL 1, occupant constraint by the lap belt 4c of the seat belt 4 can be largely improved.

Moreover, each of the predetermined number of projections 17 is provided so that the sliding resistance between the seat belt 4 and the seat-belt sliding member 13 in the normal time is small and the sliding resistance between the seat belt 4 and the seat-belt sliding member 13 when the seat belt 4 slides to the lap belt 4c side in an emergency is larger than the sliding resistance between the seat belt 4 and the seat-belt sliding member 13 when the seat belt 4 slides to the shoulder belt 4b side. As a result, when the seat-belt retractor 3 retracts the seat belt 4 by means of the operation of the pre-tensioner or the like in the beginning of the emergency, the seat belt 4 can slide from the lap belt 4c side to the shoulder belt 4b side easily and smoothly even if the seat belt 4 is brought into contact with the projections 17 with a relatively large contact force. Therefore, the occupant constraint by the seat belt 4 in the beginning can be improved. Also, when the tension of the seat belt 4 is increased by the inertia of the occupant after the seat belt has been retracted, extension of the lap belt 4c can be suppressed further effectively by the large sliding resistance between the seat belt 4 and the seat-belt sliding member 13. Therefore, the occupant constraint by the seat belt 4 with respect to the inertial movement of the occupant can be improved furthermore.

Moreover, since the end face 17a of the projection 17 on the shoulder belt 4b side is a flat or substantially flat face and also, the end face 17b on the lap belt 4c side is an arc-shaped or substantially arc-shaped curved face, slidability of the seat belt 4 of seat-belt retraction in the beginning of an emergency is made favorable with a simple structure, and extension of the lap belt 4c when the tension of the seat belt 4 is increased by the inertia of the occupant after the seat belt has been retracted in the beginning of an emergency can be effectively suppressed. Therefore, the lap of the occupant is firmly constrained by the lap belt 4c, and the occupant constraint by the seat belt 4 can be improved. Moreover, at least in a part of the projections 17, by setting the angle θ1 formed by the tangent γ of the concentric circle α at the contact β where the concentric circle α of the arc of the seat-belt sliding face 14 is tangent to the projection 17 and the plane of the end face 17a on the shoulder belt 4b side at the contact β larger than the angle θ2 formed by the tangent γ of the concentric circle α and the tangent δ of the arc-shaped curved face of the end face 17b on the lap belt 4c side at the contact β, the above-described extension of the lap belt 4c can be suppressed more effectively.

Moreover, the seat-belt sliding face 14 is provided at least on the both end portions in the longitudinal direction of the belt insertion hole 12. As a result, even if the recess portions 15 and 16 are provided in the seat-belt sliding face 14, the both side ends in the longitudinal direction of the seat belt 4 are located on the seat-belt sliding face 14 on the both end portions in the longitudinal direction of the belt insertion hole 12, and thus, it becomes less likely that the both side ends of the seat belt 4 are located in the recess portions 15 and 16. Therefore, even if the recess portions 15 and 16 are provided in the seat-belt sliding face 14, reversion of the seat belt 4 in the belt insertion hole 12 of the tongue 6 is suppressed, and the slidability between the tongue 6 and the seat belt 4 can be further improved. As a result, handling performances of the tongue 6 and the seat belt 4 are improved furthermore.

Moreover, all the projections 17 are provided so that they do not protrude outward beyond the seat-belt sliding face 14 from the recess portions 15 and 16. As a result, the seat belt 4 slides with respect to the seat-belt sliding face 14 and is rarely brought into contact with the projections 17 or even if it is brought into contact with the projections 17, the contact force is extremely small in the normal time. Therefore, even if the predetermined number of projections 17 are provided, the sliding resistance between the tongue 6 and the seat belt 4 can be reduced. As a result, even if the predetermined number of projections 17 are provided, the tongue 6 can slide with respect to the seat belt 4 easily and smoothly in the normal time, and handling of the tongue 6 in the normal time can be facilitated furthermore.

Moreover, the recess portions 15 and 16 are provided in the same direction or substantially in the same direction as the seat-belt insertion direction, and the projections 17 are provided in alignment in the same direction or substantially in the same direction as the extended direction of the recess portions 15 and 16. As a result, the slidability between the tongue 6 and the seat belt 4 in the normal time can be made favorable, and extension of the lap belt 4c in an emergency can be suppressed further effectively.

On the other hand, according to the seat belt device 1 using the tongue 6 of this example, sliding of the tongue 6 with respect to the seat belt 4 in the normal time can be made easily and smoothly, and the sliding of the seat belt 4 with respect to the tongue 6 in extension of the seat belt 4 by the inertial movement of the occupant in an emergency is suppressed, and extension of the lap belt 4c can be suppressed more effectively. As a result, wearing performances of the seat belt by the occupant in the normal time can be improved furthermore and constraint on the occupant in an emergency can be improved furthermore.

Figure 6:
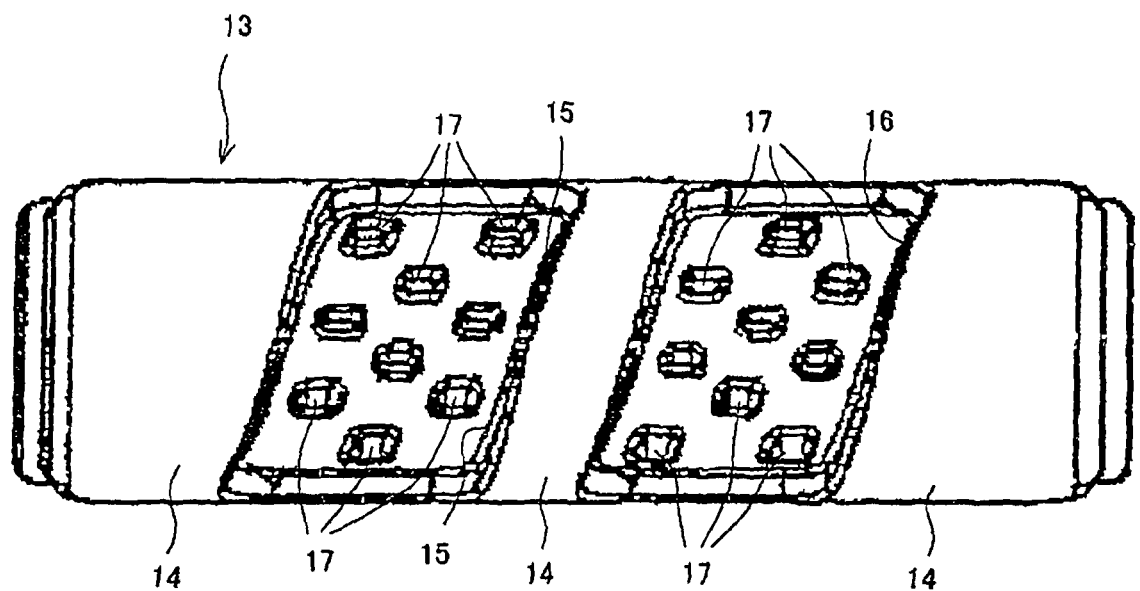
FIG. 6 is a lower face view similar to FIG. 3(B), schematically illustrating another example of the embodiment of the tongue of the present invention.

FIG. 6 is a lower face view similar to FIG. 3(B), schematically illustrating another example of an embodiment of a tongue of the present invention.

In the tongue 6 in the above-described example, the projections 17 are linearly aligned in the longitudinal direction and provided in the alignment in the seat-belt insertion direction, but in the tongue 6 of this example, as illustrated in FIG. 6, the projections 17 are disposed in the staggered state in both directions of the longitudinal direction and the seat-belt insertion direction. The other configurations of the tongue 6 in this example are the same as the tongue 6 in the above-described example and the other configurations of the seat belt device 1 are the same as those in the above-described example. Also, the working effects of the tongue 6 and the seat belt device 1 in this example are also the same as those in the above-described example.

In the above-described example, the resin mold portion 9 is provided, but in the tongue of the present invention, the resin mold portion 9 may be omitted. In that case, the recess portions 15 and 16 and the projections 17 are provided on the tongue plate 8. The number of the recess portions 15 and 16 and the number of the projections 17 are not limited to each of the above-described examples and can be provided in the arbitrary numbers. In short, the tongue of the present invention is capable of various design changes within a range described in claims.

INDUSTRIAL APPLICABILITY

The tongue and the seat belt device of the present invention can be favorably used in a tongue slidably supported by a seat belt and engaged with a buckle and a seat belt device provided with the same in a seat belt device equipped in a vehicle such as an automobile and constraining an occupant with a seat belt.

REFERENCE SIGNS LIST

1 seat belt device, 3 seat-belt retractor, 4 seat belt, 4a belt anchor, 4b shoulder belt, 4c lap belt, 5 belt guide, 6 tongue, 7 buckle, 8 tongue plate, 9 resin mold portion, 10 buckle insertion portion, 12 belt insertion hole, 13 seat-belt sliding member, 14 seat-belt sliding face, 15, 16 recess portion, 17 projection, 17a end face on the shoulder belt side, 17b end face on the lap belt side, 17c distal end, 17d, 17e side end face

The invention claimed is:

1. A tongue which is slidably supported by a seat belt, divides said seat belt into a shoulder belt and a lap belt and is provided capable of being engaged with a buckle, comprising:

an elongated belt insertion hole through which said seat belt is inserted; and a seat-belt sliding portion having a seat-belt sliding face which forms a part of said belt insertion hole and on which said seat belt slides, wherein said seat-belt sliding portion has a predetermined number of recess portions disposed in said seat-belt sliding face and a predetermined number of projections disposed independently of each other in a dotted state in said recess portions;

each of said projections is provided such that sliding resistance between said seat belt and the seat-belt sliding portion is small in a normal time and the sliding resistance between said seat belt and the seat-belt sliding portion when the seat belt slides to said lap belt side in an emergency is larger than the sliding resistance between said seat belt and the seat-belt sliding portion when said seat belt slides to said shoulder belt side;

wherein all said projections are provided so as not to project from said recess portions beyond said seat-belt sliding face.

2. The tongue according to claim 1, wherein an end face of said projection on said shoulder belt side is a flat or substantially flat face, and an end face of said projection on said lap belt side is an arc or substantially arc curved face.

3. The tongue according to claim 2, wherein the end face on said shoulder belt side of at least a part of said projections is provided so as to be orthogonal or substantially orthogonal to said seat belt, and the end face on said lap belt side of at least a part of said projections is provided so as to be oblique to said seat belt.

4. The tongue according to claim 1, wherein said seat-belt sliding face is provided at least on both end portions in the longitudinal direction of said belt insertion hole.

5. The tongue according to claim 1, wherein all said recess portions are extended in the same direction as the insertion direction of said belt insertion hole of said seat belt or extended substantially in the same direction as said insertion direction when said seat belt is worn.

6. The tongue according to claim 5, wherein said projections are provided in alignment in the same direction as the extended direction of said recess portions or provided in alignment substantially in the same direction as the extended direction of said recess portions when said seat belt is worn.

7. A seat belt device provided at least with a seat belt, a seat-belt retractor that retracts this seat belt, a tongue slidably supported by said seat belt, and a buckle in which this tongue is inserted and engaged, in which said seat belt is worn by an occupant by inserting and engaging said tongue in said buckle, characterized in that said tongue is formed of the tongue described in claim 1.

8. The tongue according to claim 1, wherein said projections are disposed in a staggered state in both directions of the longitudinal direction and the seat-belt insertion direction.

9. The tongue according to claim 1, wherein said projections are linearly aligned in the longitudinal direction and the seat-belt insertion direction.

\* \* \* \* \*